US010931891B2

(12) United States Patent
Ferguson

(10) Patent No.: US 10,931,891 B2
(45) Date of Patent: Feb. 23, 2021

(54) METHOD FOR SPECTROGRAM IMAGE RESTORATION

(71) Applicant: YES WAY INTELLECTUAL HOLDINGS, LLC, Portland, OR (US)

(72) Inventor: Kevin M. Ferguson, Beaverton, OR (US)

(73) Assignee: YES WAY INTELLECTUAL HOLDINGS, LLC, Portland, OR (US)

(*) Notice: Subject to any disclaimer, the term of this patent is extended or adjusted under 35 U.S.C. 154(b) by 131 days.

(21) Appl. No.: 15/675,725

(22) Filed: Aug. 12, 2017

(65) Prior Publication Data

US 2017/0359527 A1  Dec. 14, 2017

Related U.S. Application Data

(63) Continuation of application No. 14/302,291, filed on Jun. 11, 2014, now Pat. No. 9,736,400.

(51) Int. Cl.
*H04N 5/33* (2006.01)
*G06T 5/00* (2006.01)
*G06T 7/90* (2017.01)

(52) U.S. Cl.
CPC ............. *H04N 5/33* (2013.01); *G06T 5/001* (2013.01); *G06T 7/90* (2017.01); *G06T 2207/10024* (2013.01)

(58) Field of Classification Search
None
See application file for complete search history.

(56) References Cited

U.S. PATENT DOCUMENTS

| 2006/0066265 | A1 | 3/2006 | Plotz et al. |
| 2011/0305388 | A1* | 12/2011 | Wedi ............. G06T 5/005 382/165 |
| 2013/0094758 | A1* | 4/2013 | Yadav ............ G06T 5/009 382/167 |
| 2014/0002481 | A1 | 1/2014 | Broughton et al. |

OTHER PUBLICATIONS

Kong Man Seng, Trace gas measurement using a web cam spectrometer, Bachelor of Science (Hons) in Applied Physics 2010-2011, 40 pages, Department of Physics and Materials Science, City University of Hong Kong.
Svilainis, L., and V. Dumbrava. "Light Emitting Diode Color Estimation: the Initial Study." Measurements 41.1 (2008), 7 pages.

* cited by examiner

*Primary Examiner* — Clifford Hilaire
(74) *Attorney, Agent, or Firm* — Miller Nash Graham & Dunn LLP

(57) ABSTRACT

A spectrometer includes a spectrogram, digital camera and signal processing to compensate for limits of system spatial resolution, spatial distortions and lack of precision spatial registration, limited dynamic range, The spectrogram is captured by a digital camera, and the corresponding image is converted to a wavelength and magnitude with mitigation of optical point spread function and potential magnitude clipping due to over-exposure. The clipped portions of the signal are reconstructed using tangential adjacent point spread functions as a reference or adjacent channel ratios as reference. Multichannel camera detectors having unique response magnitude ratios per wavelength are exploited to make associated direct mappings, thereby making improvements in wavelength resolution and accuracy to up to at least one to two orders of magnitude.

3 Claims, 23 Drawing Sheets

METHOD FOR SPECTROGRAM IMAGE RESTORATION

CROSS-REFERENCE TO RELATED APPLICATIONS

This application is a continuation of and claims priority to U.S. patent application Ser. No. 14/302,291, filed Jun. 11, 2014, entitled "OPTICAL SPECTROMETER WITH ENHANCED SPECTRAL RESOLUTION FROM AN UNREGISTERED TRISTIMULUS DETECTOR, the disclosure of which is incorporated herein by reference in its entirety.

TECHNICAL FIELD

This disclosure relates to optical spectrometer instrumentation, and more particularly to a method of using a tristimulus detector common in commercially available cameras, including low cost consumer cameras and webcams, without the need for high resolution optics nor precision mechanical registration typically required from most spectrometers. Embodiments of the invention apply to general purpose spectrometry, with particular advantages in applications with spectral lines, including, for example, Raman spectrometry and emissions spectrometry. In addition, embodiments of the invention increase effective dynamic range of the detector by reconstructing clipped signals due to over exposure.

BACKGROUND

Applications of spectrometers, especially in applied spectrometry for determining chemical composition and deformulation, chemical properties, structural integrity and chemical verification against counterfeit or mishap, are of great interest to the pharmaceutical, forensics, biotechnology, food and agriculture, mining, mineralogy, gemology, petroleum exploration, medical diagnostics, electronics and other industries. For food and agriculture, spectrometry has been applied for determining the composition and ripeness of food as well as for detecting contamination due to harmful chemical agents and pathogens such as infectious bacteria. Nutritional information of food ingredients and food in solution may be determined using methods such as Raman spectrometry, which uses a spectrometer to measure the shifts in light (visible and/or infrared) from a monochromatic excitation, typically from a laser, to other frequencies. In all applications, the wavelength or wavenumber, the inverse of wavelength, are important. In some cases, for example for Raman spectrometry, the difference between the excitation spectral line wavenumber and the measured spectral line wavenumbers are important.

FIG. 1 is a diagram that illustrates functional blocks and processing for a conventional spectrometer. Sometimes spectrometers are also called spectrographs or spectroscopes, and the terms are used interchangeably in this description. Spectrometers, spectrographs, and spectroscopes produce spectrograms, which are visual representations of spectral frequencies. Sometimes an entire system is described as a spectrometer, with a spectrograph or spectroscope described as a component of the spectrometer system.

Conventional spectrometer technologies include an internal or external light source 2, an optional specimen for determining absorption, transmission or re-emission 4, a spectroscope 6 that produces a spectrogram, a detector 8, processing for removing background signal and noise 10, and optionally further normalization 12 for the cases of absorption and transmission measurement. FIG. 2 is a block diagram illustrating a conventional Raman spectrometer. As shown in 24 of FIG. 2, the conventional spectroscope 6 of FIG. 1 typically has optional front end optics 26 and 28, a monochromator 30 (an optical dispersion spectral separator) such as an optical grating, prism or similar mechanism, optional second optics (sometimes combined with the detector as in a camera 32), and an optically isolating housing which may or may not include the entire detector.

Spectrometry, which in general is the application of spectrometers to study objects, typically requires a controlled light source, commonly a laser or broad band source. However, the spectrometer is often a separate device and does not include the light source. The detector within the spectrometer is generally sensitive across a broad band of radiation frequencies. In some cases, tristimulus detectors have been used, for example Charge Coupled Device (CCD) cameras with optical red (R), green (G) and blue (B) filters, but only for determining a single intensity estimate along the position of the spectrogram. This intensity estimate is taken directly from a color image, which is comprised of red, green and blue (RGB) primaries. Since the intensity is associated only with spatial position along the spectrogram, the resulting spectral resolution is limited to the resolution of the optics. The resolution of the optics is typically primarily determined by the width of the slit opening where the light enters the spectrometer.

For example, the Rspec Explorer is a relatively inexpensive commercially available spectrometer, available from fieldtestedsystems.com. Its USB camera is housed in a black box which also includes a diffraction grating and lens. A separate pair of adjustable black foamboard panels are supplied to provide an optical slit, which may be a few feet or further away from the black box. This external slit determines the limit of the optical resolution and therefore also the spectral resolution. A narrow slit improves resolution, but limits the light level for the spectrometer. Thus there is the classic trade-off between spectral resolution and signal to noise ratio. The USB camera is an RGB based CCD camera that captures the conventional image of the camera, with the diffraction grating image super-imposed on the right side. Software that runs on a PC takes this image and creates magnitudes from the RGB image of the spectrogram.

The determination of measured wavelengths or wave numbers from the typical spectrometer are generally determined by spatial location, in turn determined by design, requiring strict adherence to particular alignment of all components in the optical path, and usually further refined through calibration. The difficulty of alignment has been mitigated in many cases by using lenses and filters in two directions, with beam splitters and other optical components that tend to be lossy, that sometimes causes marginal signal-to-noise ratios.

In the Rspec Explorer example, the user must align the peak of the slit from the direct camera image to a reference line (graticule) shown in a window of the corresponding software application on the computer. The alignment is typically somewhat tedious and imprecise as the peak is often too broad due to the slit being too wide. If instead the slit is narrow enough for precise alignment, the resulting spectrum magnitude is typically near or below the noise floor of the camera, or the reference peak is so high that it is beyond the dynamic range of the camera, resulting in clipping. This clipping means limiting the peak to the maximum camera digital code for amplitude in the respective channel(s). So, as with other spectrometers, the wavelength resolution of the Rspec Explorer is no better than the optical resolution determined by the combined point spread function of a slit, the resolution of the CCD, and the intermediate optics. And, as with other spectrometers, because of the trade-off between light intensity and resolution due to slit width, the camera's CCD dynamic range, determined by sensitivity and noise floor, also factors into the determination of the optical resolution and thus the spectral resolution.

Another type of existing spectrometer is one that uses a simple very low cost spectrogram and a web cam detector. Many of the key performance issues with this prior art is summarized in Kong Man Seng, "Trace gas measurement using a web cam spectrometer," March 2011, City University of Hong Kong, Department of Physics and Materials Science. The "Discussion" of section 5, page 33-40, discusses the typical issues with slits, alignment, optics, noise and similar issues that cause limited optical resolution and dynamic range. This same section includes some of the typical methods for mitigating these issues, the vast majority of which depend on improving optical resolution directly, improving alignment mechanically and increasing light source power along with heat and other energy management required to prevent damage to components due to the increased radiation.

In general, typical methods for improving spectrometer accuracy have been to increase optical resolution and precision, increase precision of overall mechanical and optical alignment, increase light power, and to increase detector dynamic range. Each of these increases cost with ever diminishing returns of improvement. Detector dynamic range is typically improved by reducing the noise floor and allowing for integrating steady state or repeated signals over time. The most common detector uses CCD technology. For highest dynamic range, the CCD is cryogenically cooled to mitigate one form of noise, while other forms of noise are still present. The noise types can be rebalanced by custom CCD design, thus improving cryogenic performance. The resulting detector system may be orders of magnitude more expensive than one based on consumer camera technology.

Many alternative designs attempt to mitigate issues associated with the loss of light through filters, narrow slits, etc., typically by adding more expensive optical components, light sources and the like.

Further, depending on the specific optical arrangement, often the wavelength as a function of distance along the spectrogram primary (frequency) axis is non-linear and follows a cosine function. Cosine correction is optionally included, often complicating the design.

These improvements in accuracy add significant expense. Many of the methods to improve accuracy, especially in combination, also cause the instruments to be large, bulky and prevent portability, or require additional significant expense to reduce size. Also, when integration is required to compensate for weak signals due to small slit size, the stability of the light source becomes critical, thus increasing cost, size and complexity of the light source. For the extra electronics and light power, the power supply required becomes significantly larger and more expensive.

Embodiments of the invention address these and other limitations of the prior art.

SUMMARY

Embodiments of the invention are directed toward a simple, inexpensive method that does not require bulky, high power components nor such precision optical resolution nor careful alignment of the optical path, allowing for the detector to be more arbitrarily placed relative to the spectrogram image, and allowing for adaptation to spatial shifts, tilts, geometric distortions and other results of misalignment. This not only simplifies the rest of the design, but also allows for the detector to be separate from the spectrogram. Thus, using embodiments of the invention, the detector can be the camera on a smart phone, personal computer, webcam or consumer stand-alone electronic camera, hand-held or mounted, to digitally capture the spectrogram image. The remaining components for creating the spectrogram may be as few as the spectral separation component, such as a diffraction grating, the housing and a light source (for some applications such as gemology, an external, even natural light source). It is also particularly desirable to not require the optical resolution to determine the spectral resolution, especially for spectral lines as is inherent in Raman spectroscopy and emissions spectroscopy.

Accordingly, embodiments of the invention provide an optical spectrometer with significant improvements in accuracy for both simple, inexpensive components and systems as well as for more expensive and higher precision components and systems. Many applications formerly requiring expensive precision components may now be replaced with a spectrometer system with liberal spatial alignment of many principal components, and in particular with potentially very liberal spatial alignment of the spectrogram with the detector. For spectral lines, the optical resolution may be orders of magnitude worse for the same resulting spectral resolution. In one embodiment, the method uses a relatively low cost electronic camera that produces a tristimulus image of red, green and blue (RGB) samples per pixel. These channels with different wavelength sensitivities are used to determine wavelength mostly independently from the optical resolution. The dynamic range is less limited due to compensation for clipping.

For transmission, reflection and/or absorption, that typically requires a reference broadband light signal (for example, white light), the reference spectrogram is captured as RGB, converted to magnitude, and the wavelength of each spatial location of the spectrogram within the image is determined algorithmically. Subsequently, measurements may be made with magnitude relative to the reference for each wavelength according to spatial location in the RGB image.

For emissions, including those from burning, Raman scattering and similar line spectra, no reference broadband spectrogram need be captured. Generally, the relative line spectra magnitudes are used for analysis, including chemical identification and principal component analysis. For all embodiments, the spectral resolution and accuracy are independent from optical resolution except in the case where two or more adjacent spectral lines are close enough to be within a significant portion of the optical point spread function. In other words, for example, if a green line is smeared due to poor optical resolution, it is still a green line with unique wavelength determined by the method herein described. If a green line and a slightly more yellowish green line are blurred into each other by poor optical resolution then the resulting accuracy improvement using the method described herein may not be as significant. In many significant applications, this requirement is not a limitation.

The objects, advantages and other novel features of the invention are apparent from the following detailed description when read in conjunction with the appended claims and attached drawing views.

DETAILED DESCRIPTION

As described below, embodiments of the invention make significant improvements in measuring wavelength and magnitude from spectrogram images captured using relatively inexpensive tristimulus detectors. Such detectors are widely available as stand-alone RGB cameras, embedded in mobile devices, such as smart phones (iPhone, Andriod, Blackberry), cell phones, notepads (iPad, etc.), laptops and other portable computers, and as accessories to computers such as USB cameras (webcams, in microscopes, telescopes, etc.). Many of these detectors include processors on which particular operations may be performed, described in detail below.

In addition, embodiments of the invention improve the effective spectral resolution beyond the limits of the system optical resolution not only due to the optical limits of the apparatus for capturing the image of the spectrogram, but also beyond the optical limits of the spectrogram being captured. The amplitude measurement improvement includes both noise mitigation and non-linear distortion mitigation. The noise mitigation is achieved from both temporal and spatial integration of the appropriate wavelength. The non-linearity mitigation includes reconstructing peaks that have been clipped due to over-exposure. Together, these improvements in magnitude dynamic range can be over an order of magnitude. For sufficiently separated line spectra, the resulting improvement in spectral resolution and accuracy can be orders of magnitude.

Figure 1:
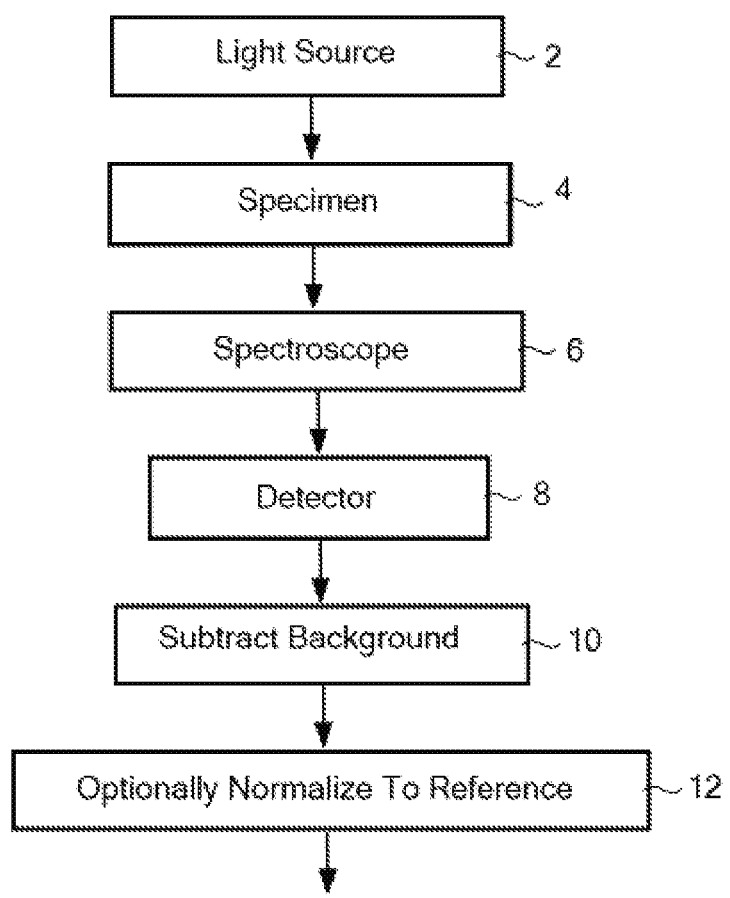
FIG. 1 is a generic block diagram view of a conventional spectrometer and process flow.
Figure 2:
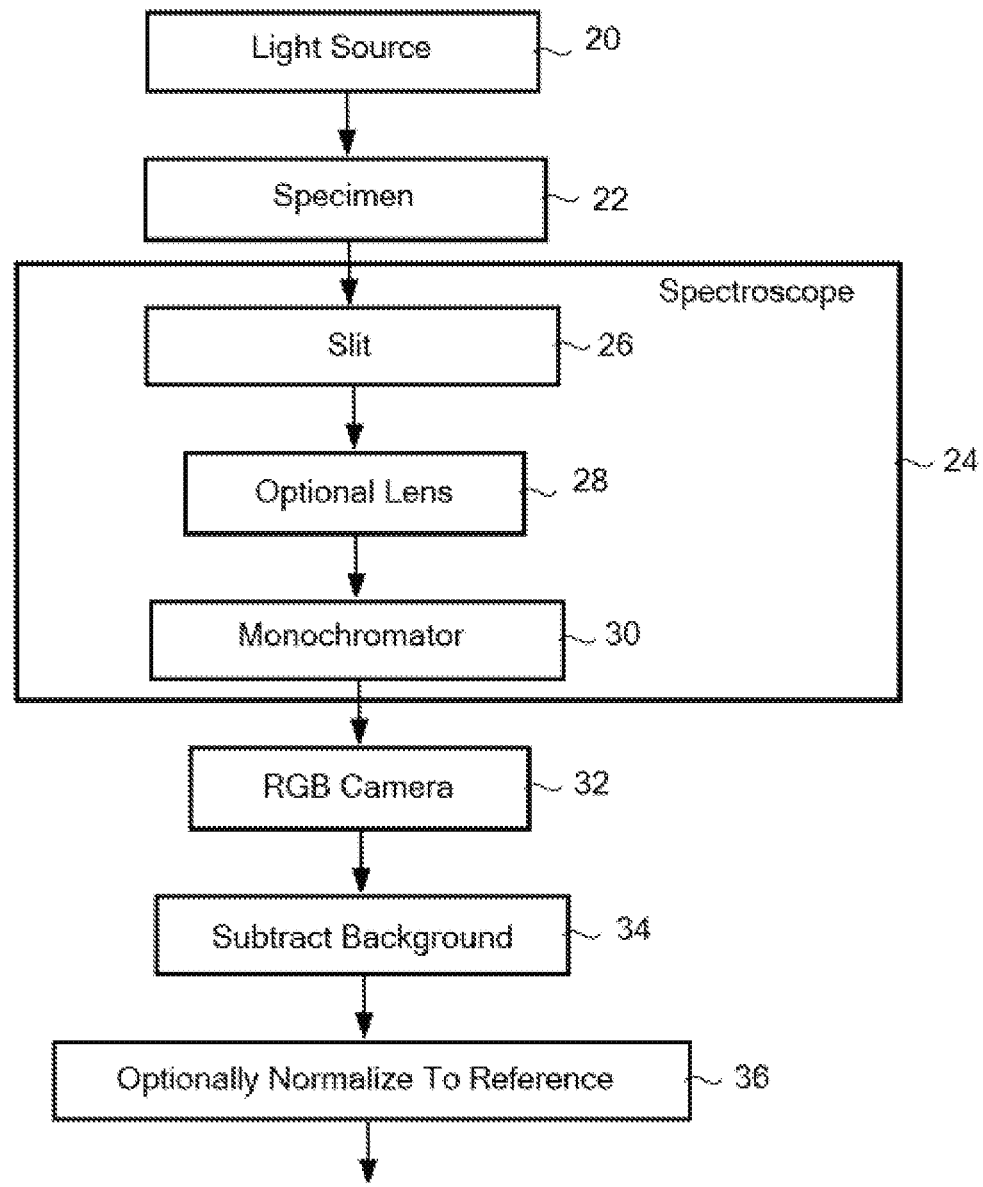
FIG. 2 is a generic block diagram view of a conventional Raman spectrometer and process flow according to the prior art.
Figure 3:
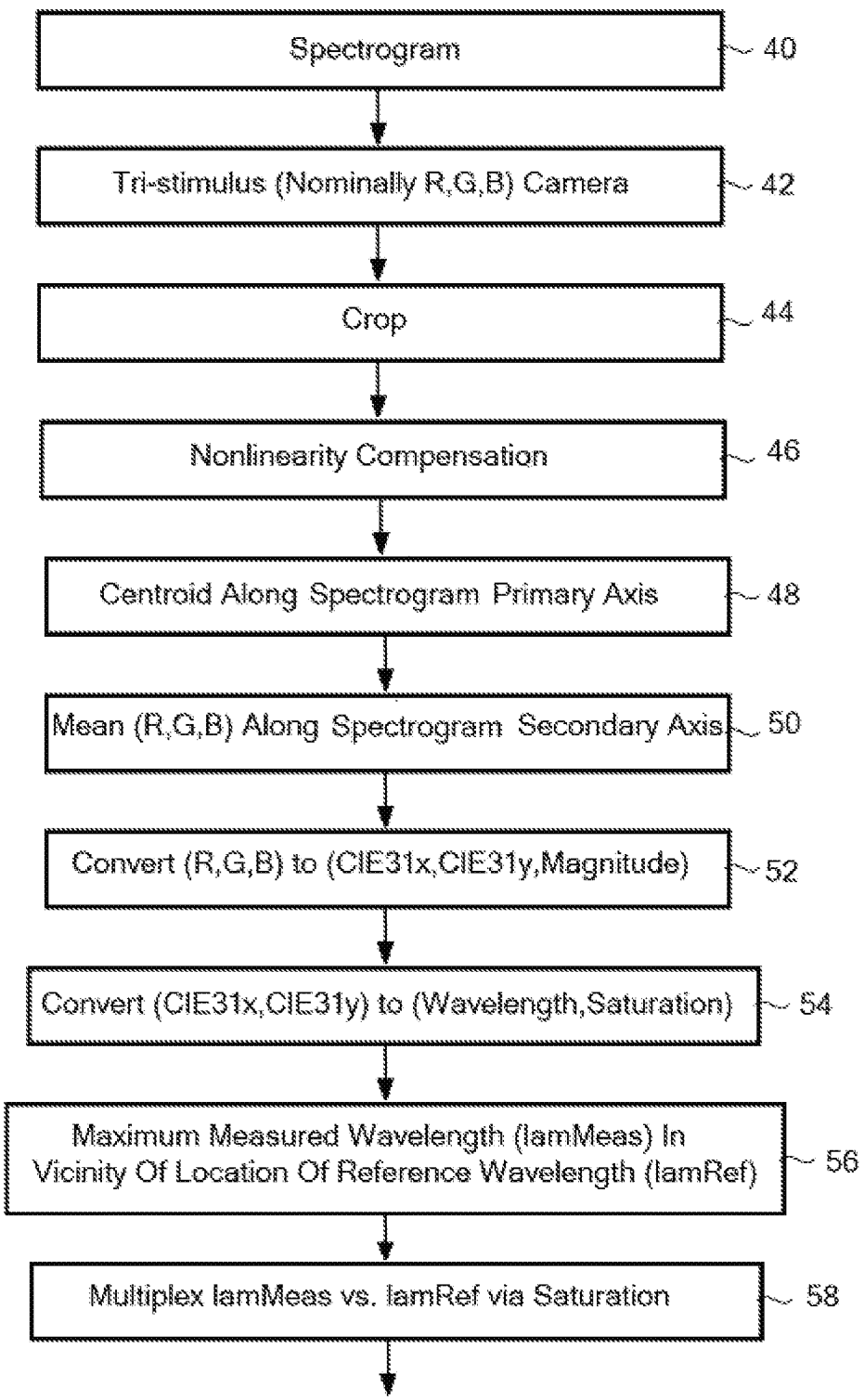
FIG. 3 is a generic block diagram illustrating components and process flow of a simple, inexpensive, relatively accurate spectrometer according to embodiments of the invention.

Referring now to FIG. 3, first a spectrogram image 40 is detected and captured using a camera 42 or other equivalent detection and capture system. Embodiments of the invention takes advantage of low cost and increasingly accurate CCD camera technologies that generally have red, green and blue channels per pixel. However, fundamentally other detector arrangements may be used as long as for each wavelength detected, there are unique ratios of the 2 or more sensors. For example, for the region between green and red, each wavelength of the spectrum produces unique ratios of the G and R channel responses. In an alternative embodiment, this unique ratio scheme may be extended down to the infra-red, IR, region and into the ultra-violet, UV, region of the commercially available (CCD) camera by eliminating the corresponding optical filter. Thus, mapping the wavelength to the corresponding ratios, the following processing may be adapted to any number of color or frequency response channels using the same principals and the same processing blocks, including a wide spectrum IR-VIS-UV spectrogram. The visible spectrum, an RGB image, is the nominal embodiment, preferred for corresponding applications. The description of the RGB case is sufficient for those versed in the arts to produce other embodiments tuned to other frequency bands using the same methods for mitigating optical resolution and dynamic range using the methods of this invention. The RGB image of the spectrogram is converted to magnitude and wavelength as described below.

Processors running on the image capture device or on a spectrometer may perform processing by running operations in software running on such processors. In some embodiments functions or operations may be programmed onto an FPGA or other firmware or hardware.

The RGB spectrogram image is optionally cropped in operation 44 to remove portions of the image that surround the spectrogram, thereby reducing the amount of pixels to process, for speed and/or reduced computation. For a nominally dark surround, cropping is performed by eliminating each line at the top and bottom, and each column on the right and left where all pixels are below a useful amplitude threshold corresponding to a noise floor or black. In a preferred embodiment, the cropped spectrogram has a small border of black sufficient to measure the noise floor on both sides, top and bottom. Alternatively, the cropping may be performed by removing the portions of the image that do not correlate well with the relatively saturated colors in order as is expected with a spectrogram. The cropped result is an image with mostly pure colors or black, with colors changing along the primary axis and colors being relatively constant, but with varying intensity, along the secondary axis. In an alternative embodiment, rotation of the spectrogram image is performed before or after cropping such that the primary axis is parallel to image rows or lines, and the secondary axis is parallel to the image columns.

Figure 4:
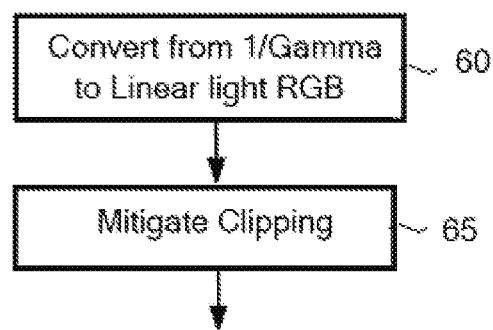
FIG. 4 is a block diagram view of methods of nonlinearity compensation according to embodiments of the invention.
Figure 5:
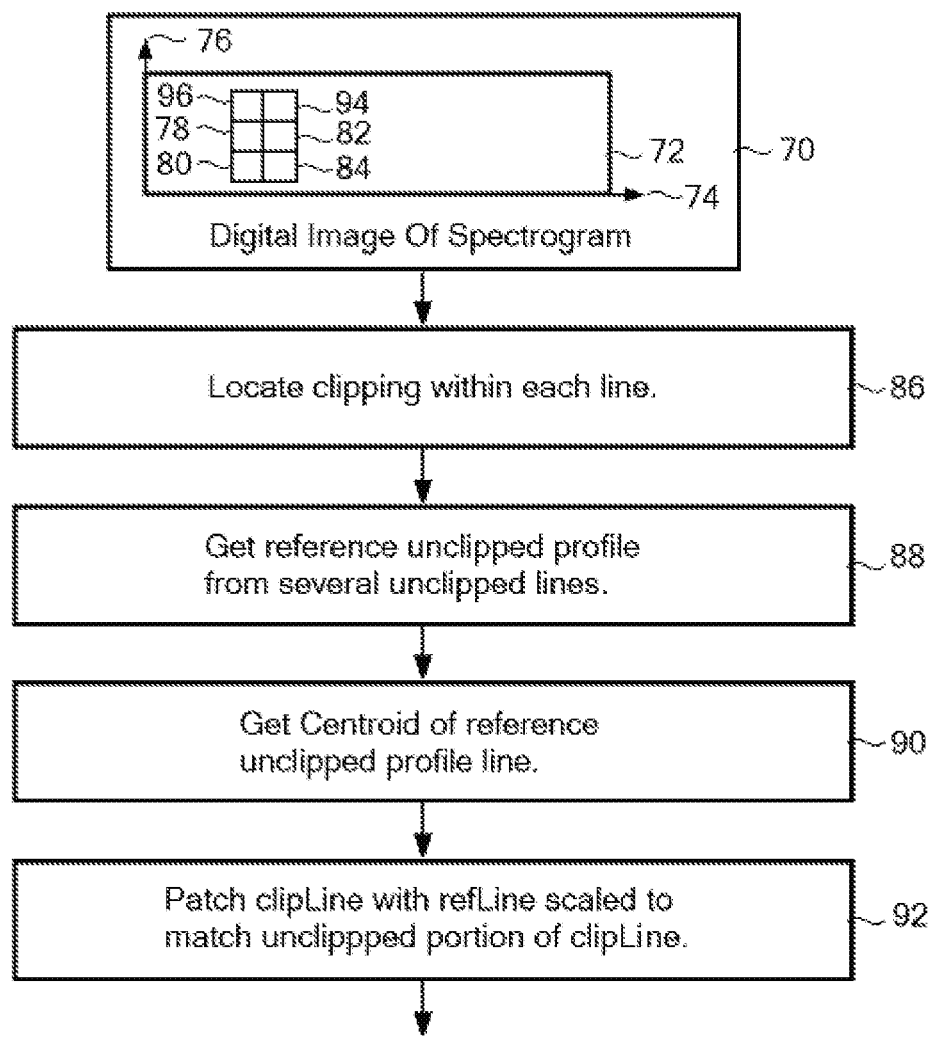
FIG. 5 is a block diagram of method of the mitigation of clipping due to over-exposure according to embodiments of the invention.

Next, two types of nonlinearity of the spectrogram are compensated in an operation 46 as shown in more detail in FIGS. 4 and 5. Each channel, R, G and B, is converted in an operation 60 to "linear" light through the gamma portion of the reverse transform from CIE1931 xy coordinates as defined by the respective colorimetry specification. Then any clipping due to over-exposure is compensated in an operation 65 by estimating the clipped signal. Details of both of these methods follow.

As per most digitally encoded images, a gamma power function is used. So in order to apply linear operations such as integration, scaling, etc. to each channel, the inverse of the gamma power function must be first applied. For example, for sRGB, the linear representations, Rlinear, Glinear and Blinear are calculated according to well known techniques as follows:

If Rlinear<=0.03928
Rlinear=R+12.92
else
Rlinear=$((R+0.055)/1.055)^{2.4}$
If Glinear<=0.03928
Glinear=G+12.92
else
Glinear=$((G+0.055)/1.055)^{2.4}$
If Blinear<=0.03928
Blinear=B+12.92
else
Blinear=$((B+0.055)/1.055)^{2.4}$ Next, any clipping is mitigated as shown in FIG. 5. The {Rlinear, Glinear, Blinear} spectrogram image 70, with primary axis x 74 along the change of wavelength and secondary axis y 76, perpendicular to the primary, is checked for clipping due to over-exposure. In one embodiment, the image may be further reduced for processing clipping by ignoring rows and columns below an offset (nominally 6 dB) above the noise floor, thereby resulting in a subimage 72. Any portion of the image with channel values above a threshold near or equal to the maximum possible value is considered clipped. For illustration, example of a rectanglular patch of the spectrogram image containing the clipped portion of the red channel of a broadband spectrogram is illustrated in FIG. 5 as 82.

Figure 7:
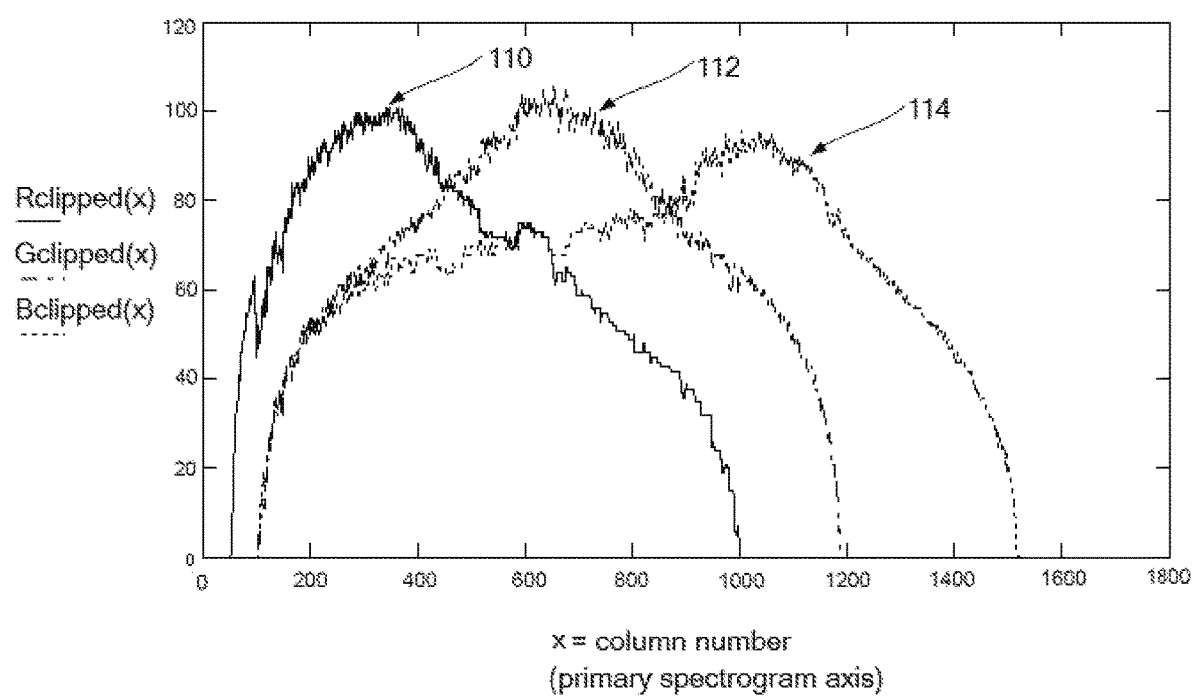
FIG. 7 is a plot of an example extent of the clipped column vs. column (primary spectrogram axis) and for each of the red, green and blue channels made by using processing techniques according to embodiments of the invention.
Figure 8:
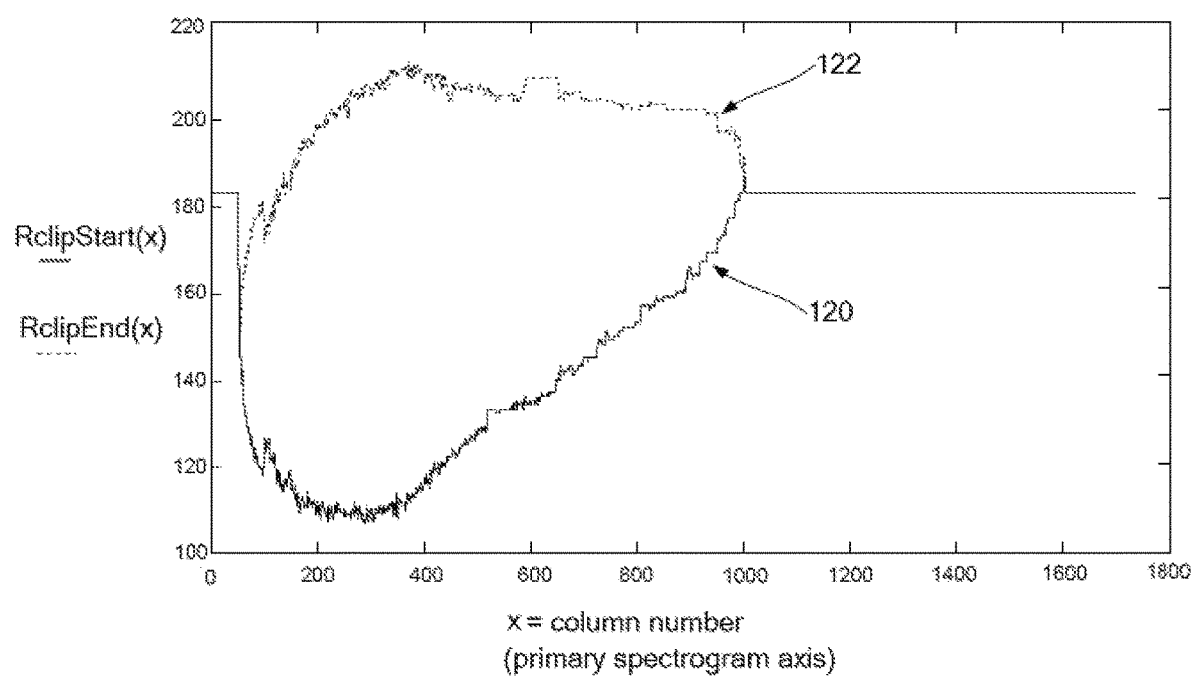
FIG. 8 is a plot of an example of the start and end of the clipped region within the respective column for the red channel made by using processing techniques according to embodiments of the invention.

If any portion of a channel is clipped, clipping is located for each x location. In other words, for each location along the principal (x) axis, the locations along the secondary (y) axis of the start, clipStart(x) and end, clipEnd(x), of clipping are saved. For example, FIG. 7 shows the portion of each column at location x clipped for the spectrogram of a bright light bulb, a broadband light source that was so bright that it caused considerable clipping in all three channels. For the Rlinear, Glinear and Blinear channels, FIG. 7 shows the number of samples clipped along the y (secondary spectrogram) axis for each point along the x (primary spectrogram) axis for each channel respectively: Rclipped(x) 114, Gclipped(x) 112, Bclipped(x) 110. FIG. 8 shows a plot of the RclipStart(x) 120 and RclipEnd(x) 122, the start and end of clipping respectively for the Rlinear channel, vs. x, the primary (column) spectrogram axis.

Referring again to FIG. 5, after this process of identifying and locating any clipped portion 82 of the signal for each channel, a corresponding clip mitigation reference signal is located. There are two principal methods of the clip mitigation reference signal. Both clip mitigation methods use a reference signal. The greater of the two reference signal corresponds to one of the respective preferred methods.

The two principal methods of clip mitigation are: A) an adjacent unclipped column or mean of consecutive unclipped columns adjacent to and within the same channel of the clipped portion 78, or B) the mean ratios of the unclipped portion of the set of Rlinear, Glinear and Blinear channels of the top and bottom portion of the clipped column 84. For the second embodiment, as an example, for each column of pixels in 82, the mean triplet {Rlinear, Glinear, Blinear} is calculated for the same column (same x value) in the combination of above 94 and below 84 the clipped portion 82. In other words the mean of nearby unclipped image segments is calculated for each channel, Rmuc, Gmuc, Bmuc. Then, for portions of the image where only Rlinear is clipped within 82, and at least one other channel is not clipped, the larger unclipped channel is the reference channel and the corresponding column is used as the local reference column within 82. Then the portion of the clipped Rlinear signal within 82 is replaced with the scaled portion of the local reference column scaled by the ratio of the mean reference channel (Gmuc or Bmuc) with Rmuc. For example, for a given column x with clipped Rlinear(x) within 82, if Glinear(x) is the only unclipped channel or if it is larger than Blinear(x), then the clipped portion of Rlinear(x,y) is replaced with Glinear(x,y)*Rmuc(x)/Gmuc(x). Let the scale factor s=Rmuc(x)/Gmuc(x)
and the reference column for a given x be given by
refColumn(y)=Glinear(y)

Figure 12:
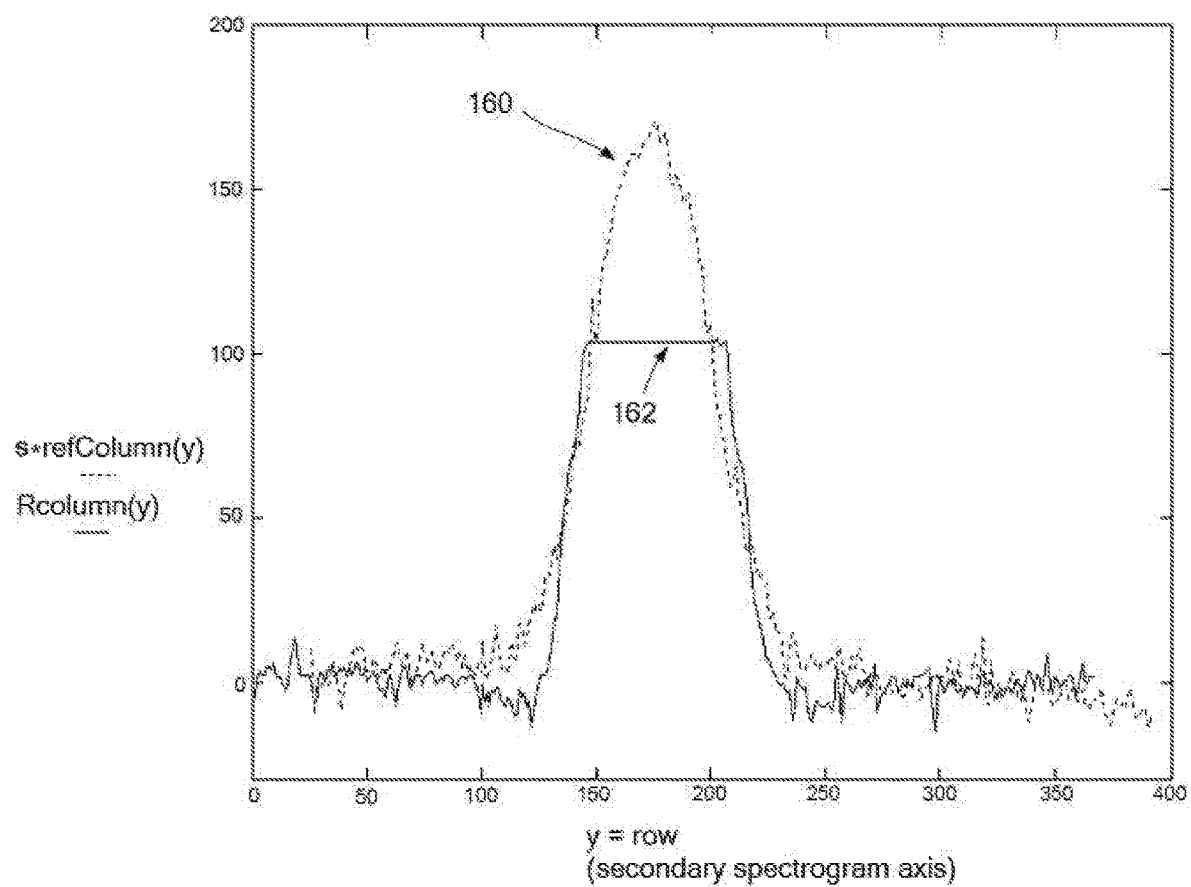
FIG. 12 is a plot of the original red clipped (over-exposed) column of an example red channel and the corresponding scaled reference column magnitude made by using processing techniques according to embodiments of the invention.
Figure 13:
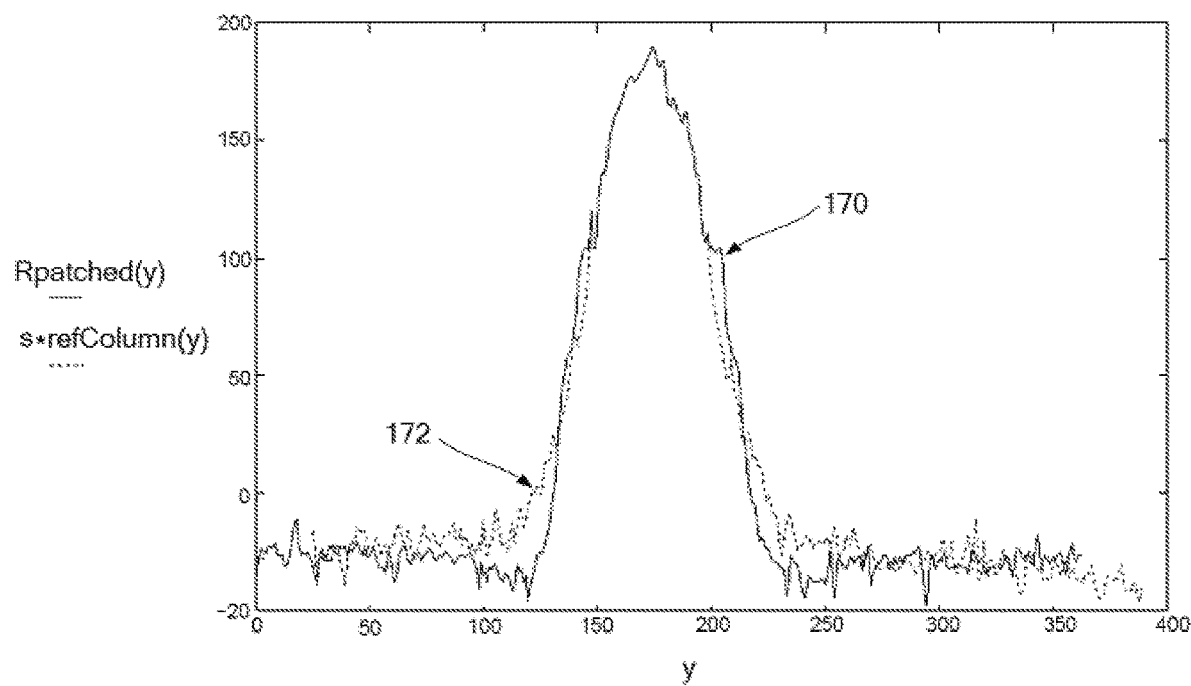
FIG. 13 is a plot of the patched red column of an example red channel and the corresponding scaled reference column magnitude made by using processing techniques according to embodiments of the invention.
Figure 14:
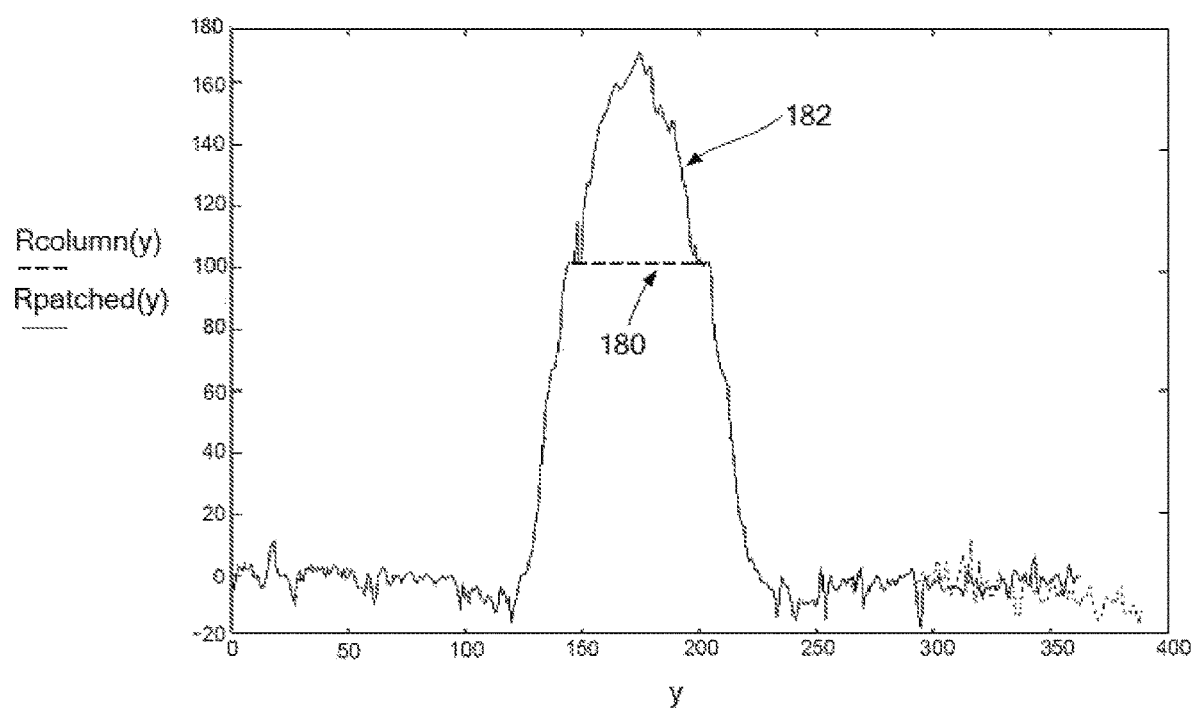
FIG. 14 is a plot of the patched red column of an example red channel and the original red clipped (over-exposed) column of an example red channel made by using processing techniques according to embodiments of the invention.

FIG. 12 shows an example of scaled refColumn 160 and the clipped Rcolumn(y)=Rlinear(y) 162 vs. row y. FIG. 13 shows the patched version of Rlinear, Rpatched 170 and the scaled refColumn 172 vs. y. FIG. 14 shows the original clipped Rlinear=Rcolumn 180 and Rpatched 182 vs y.

For the first embodiment, the same strategy of replacing a clipped signal with a ratio scaled nearby reference signal is applied. However, instead of referencing a different unclipped channel, the column segments adjacent (that is adjacent along the secondary y axis, to the top 94 and bottom 84 of 82 in FIG. 5) to the unclipped portion of the same clipped channel are used. These adjacent segments of the columns are the skirts of the point spread function. The strategy is to find the scale factor for minimum mean square error between the skirts of the clipped column and the unclipped reference column. Then this same scale factor is applied to the unclipped portion of the reference column to produce a patch to replace the clipped portion. For applications where noise filtering is required, multiple columns within each region are averaged.

Figure 6:
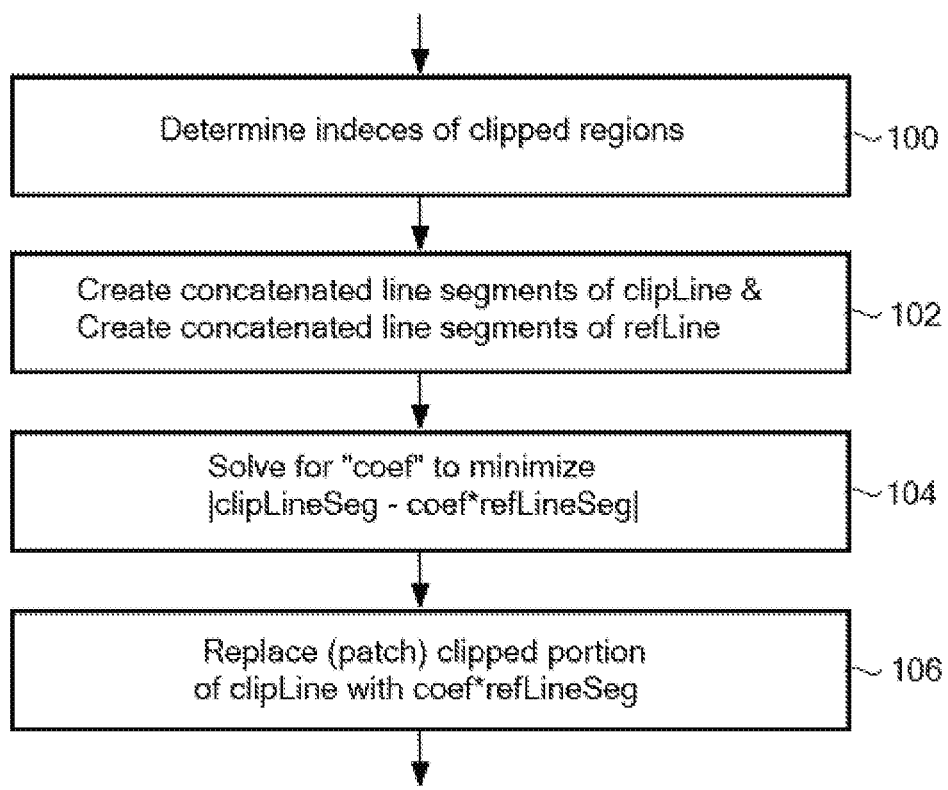
FIG. 6 is a block diagram of a method of patching a clipped channel according to embodiments of the invention.

An example method of matching skirts is as follows. As shown in the block diagram of FIG. 6, first the indices of the clipped regions are determined in operation 100. As with the first embodiment of clip mitigation, this corresponds to the region contained within 82 of FIG. 5, the number of clipped pixels 110, 112 and 114 vs x in FIG. 7 and the start 120 and end 122 of clipping in FIG. 8. Again referring to FIG. 6, an average column curve below the clipped region is averaged and concatenated with the average column curve above the clipped region in operations 102, 104 and 106. This assumes that A) the optical point spread function guarantees a non-clipped samples of the digital image at the boundaries of the clipped portion of the image (i.e. 94 and 84 are above 0 and not clipped) and B) the intensity profile across the spectrum naturally includes some unclipped portion (i.e. 78 is above 0 and not clipped).

Figure 9:
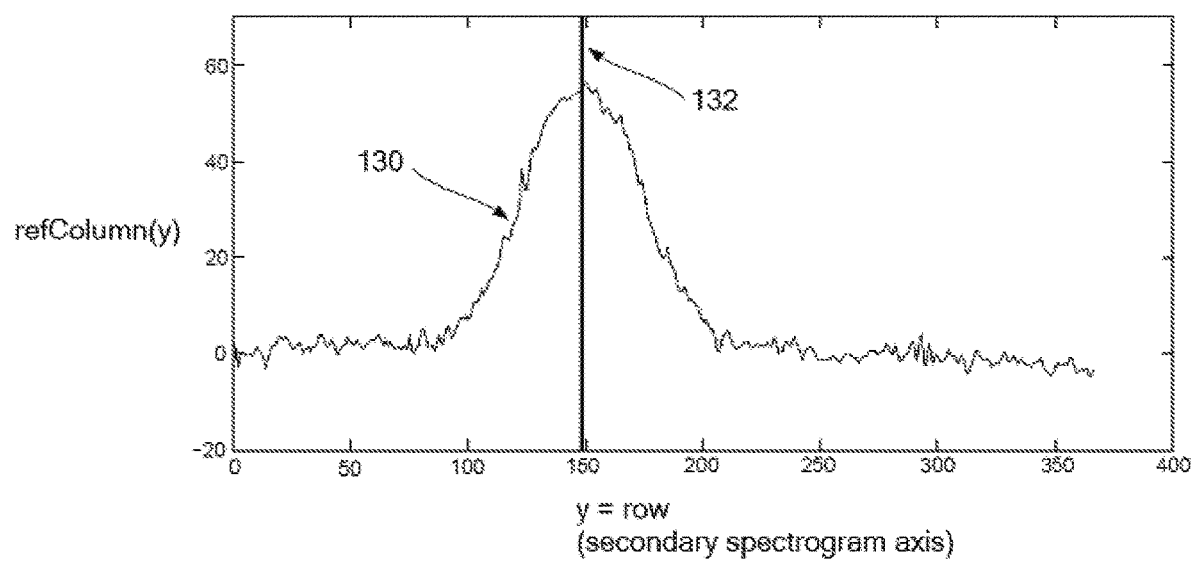
FIG. 9 is a plot of a reference magnitude profile across a column in a portion of the spectrogram adjacent to a clipped region made by using processing techniques according to embodiments of the invention.

Using the same example of FIGS. 7 and 8, FIG. 9 shows a plot 130 of refColumn(y), the average of a few unclipped columns 78 (FIG. 5) adjacent to the clipped portion of the red channel, with a vertical line 132 near the middle indicating the location of the corresponding centroid.

Figure 10:
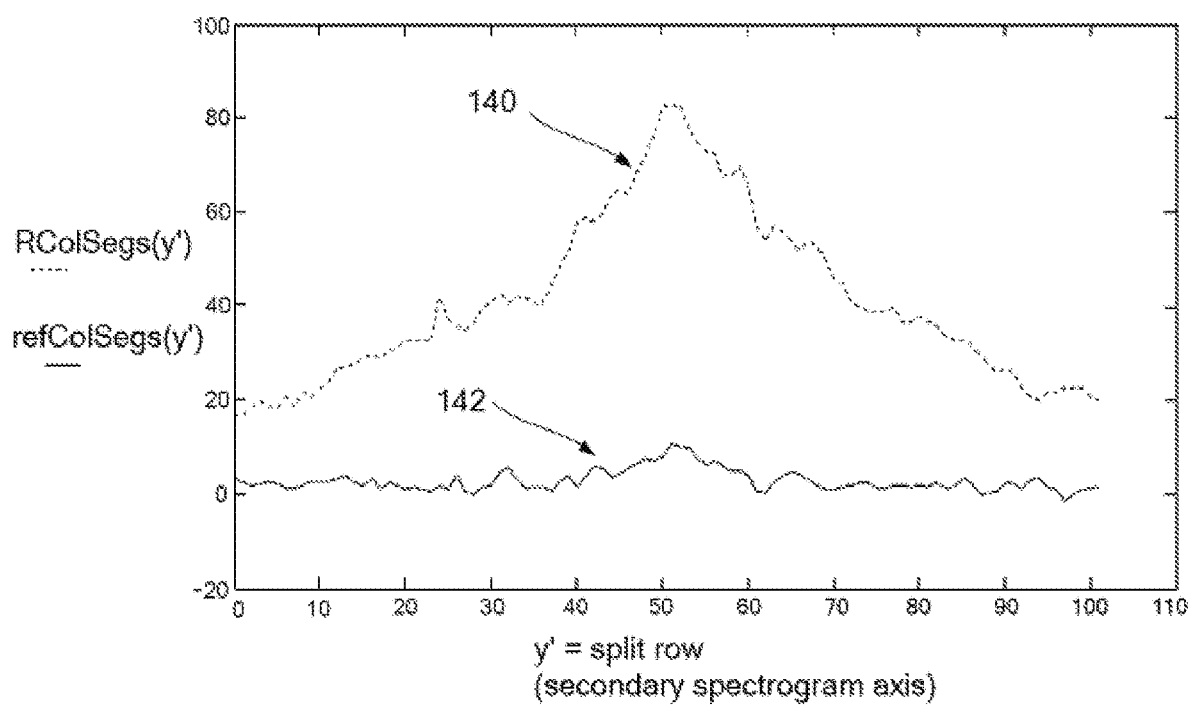
FIG. 10 is a plot of the non-clipped (not over-exposed) portions of an example red channel and the corresponding portions of the reference magnitude profile made by using processing techniques according to embodiments of the invention.

The respective centroids are used for registration between respective reference unclipped and clipped columns. The result is shown in FIG. 10: concatenated column segments, that is, the unclipped portions (from skirt patches 94 and 84 of FIG. 5) of the columns of the clipped patch 82, RColSegs (y') 140 and the corresponding concatenated column segments, that is, portions (from skirt patches 96 and 80, respectively) of the reference 130 of this same channel, refColSegs(y') 142. The scale, s, of the reference used to best match these unclipped segments is determined using a least mean squared error method. Preferred embodiments use the following minimum mean least squared error method:

$$s = (refColSegs^T * refColSegs)^{-1} * refColSegs^T * RcolSegs$$

where refColSegs and RcolSegs are both N×1 column vectors.

Figure 11:
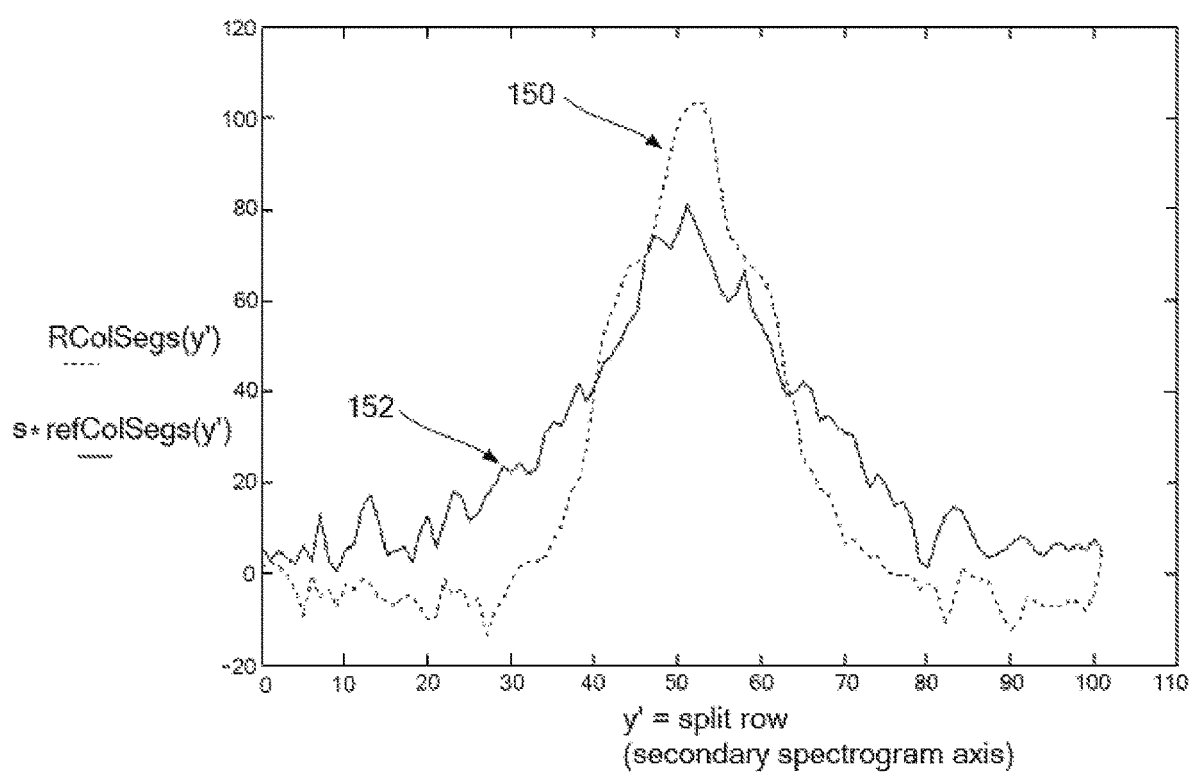
FIG. 11 is a plot of the non-clipped (not over-exposed) portions of an example red channel and the corresponding scaled portions of the reference magnitude profile made by using processing techniques according to embodiments of the invention.

Shown in FIG. 11 is the resulting rescaled concatenated reference column segments 152 as well as respective concatenated column segments of the clipped column 150.

Now applying this scale, s, also to the original portion of the reference 78, that is the portion corresponding to the clipped portion of Rlinear 82, we obtain a patch for and an estimate of the portion in Rlinear that was clipped. The result 160 is shown in FIG. 12, along with the original clipped column of Rlinear, 162. To further illustrate, this portion of the scaled reference column replaces the clipped portion of Rlinear to create a patched column Rpatched, 170, as shown in FIG. 13, along with the full scaled reference column signal, s*refColumn 172.

FIG. 14 shows the original clipped Rlinear column, 180 and the corresponding patched Rlinear column, 182.

Figure 15:
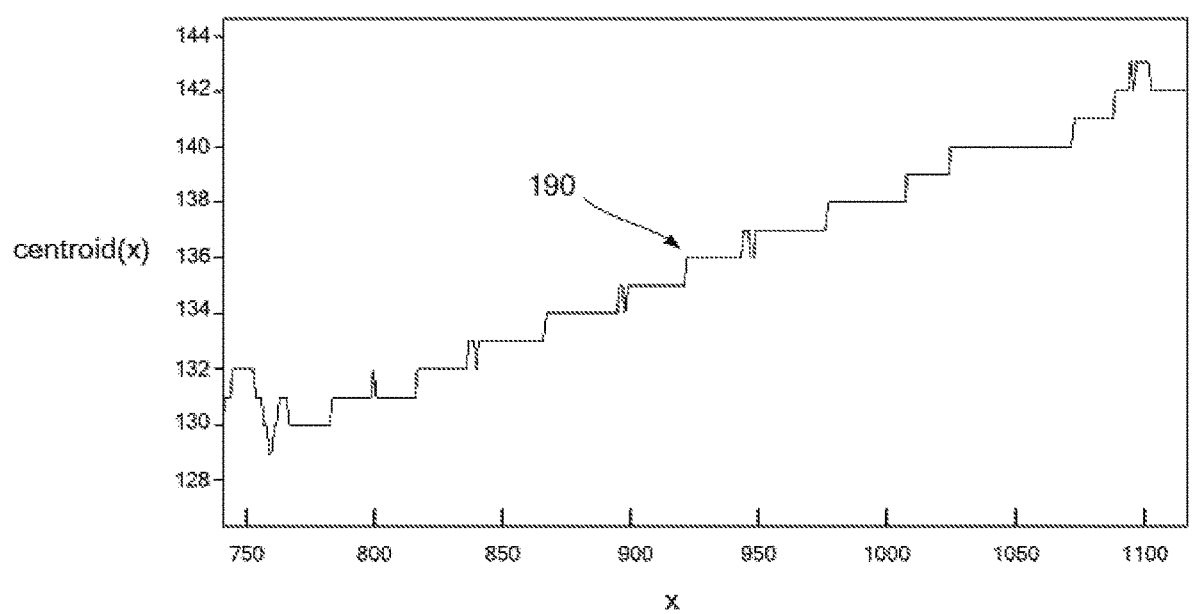
FIG. 15 is a plot of the column centroids along spectrogram primary axis made by using processing techniques according to embodiments of the invention made by using processing techniques according to embodiments of the invention.

Next a single value mean for each column is calculated for each channel. The mean value increases resolution of the relative magnitudes and reduces noise. Referring again to FIG. 3, for the corresponding step operation 48, the centroids each of Rlinear, Glinear and Blinear are found for each column. The aggregate of these centroid points create a curve that approximates a line traversing the spectrogram. An example curve for a slightly rotated and uncropped spectrogram image is shown plotted as 190 in FIG. 15.

Figure 16:
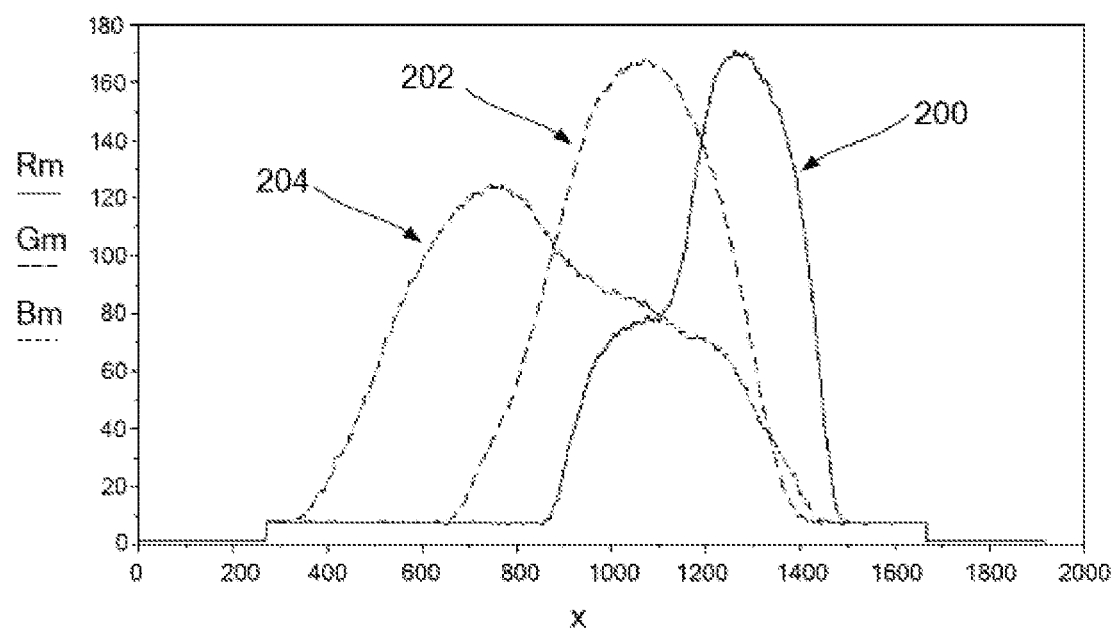
FIG. 16 is a plot of mean (R,G,B) along spectrogram secondary axis made by using processing techniques according to embodiments of the invention.

Next, in operation 50 shown in FIG. 3, the mean column value centered on the respective centroid is taken. For each channel and each column, summation is performed centered on the respective centroid and including the portions from half magnitude on the bottom to half magnitude on the top. For each column, this summation is divided by the total samples summed within the column to calculate the mean value centered on the centroid. FIG. 16 shows the corresponding mean magnitudes for Rlinear, Glinear and Blinear, that is, Rm as 200, Gm as 202 and Bm as 204, respectively.

The tristimulus set {Rm(x),Gm(x),Bm(x)} is then converted to magnitude, saturation and wavelength. The tristimulus set is converted to wavelength in steps of A) converting to coordinates in a color plane, B) projecting the color plane coordinates to coordinates of purest form in the color plane and C) selecting the wavelength whose coordinates come closest to those of the projection in step 2. One embodiment uses the very commonly used pseudo-physiological CIE1931 xy color plane.

So as not to confuse the spectrogram primary axis x, with the x of the color plane coordinate system, the remaining text of the invention details will substitute the spectrogram primary axis index variable x with n, as in {Rm(n), Gm(n), Bm(n)}. Thus the corresponding CIE1931 {x,y} values are {x(n),y(n)}.

The conversion of {Rm,Gm,Bm} to magnitude, saturation and wavelength is performed as follows. First, following each of the {Rm,Gm,Bm} values along the centroid curve are converted to CIE1931 {x,y} values using the respective colorimetry conversion operation 52 of FIG. 3. For example, most modern electronic cameras use sRGB (equivalent to BT 709 high definition television colorimetry). Details of this conversion from CIE1931 xy to wavelength and saturation, as in operation 54 of FIG. 3, are as follows.

Figure 17:
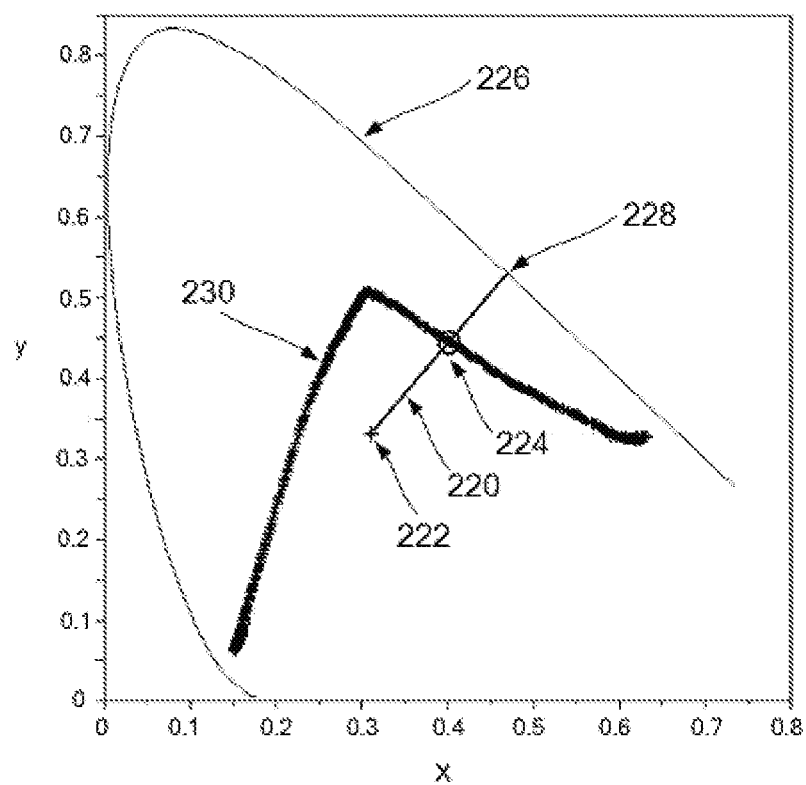
FIG. 17 is a plot in CIE 1931 xy plane depicting the conversion of xy coordinates to wavelength via projection from the reference white point through the sample point to the pure monochromatic light curve made by using processing techniques according to embodiments of the invention.

As depicted by the marked up plots of FIG. 17, the CIE1931 {x,y} values are projected to the curve corresponding to the most pure light of a given wavelength, lambda. The projection entails the generation of a line, 220, from the reference white, {xw,yw}, 222, through {x,y}, 224, and continuing to the pure curve, 226, and intersecting at 228. The wavelength corresponding to intersection 228 is the wavelength of the pure version of the {x,y} values. This process is performed for all values of each {Rm,Gm,Bm} along the spectrometer primary axis, with corresponding points in the xy plane in FIG. 17 shown by the respective curve for an example broadband light source, 230.

The slope of the projected line 220 of FIG. 17 is given by $$slope(n) = (y(n) - yw)/(x(n) - xw)$$

where {xw,yw} are the CIE 1931 coordinates for the reference white point for the camera colorimetry. In the case of sRGB, {xw,yw}={0.3127, 0.3290}.

The corresponding angle with the horizontal (x) axis of FIG. 17 is given (using matlab, octave and scilab script language) by

```
if x(n) < xw
    angleOffset = 3.1415927;
else
    angleOffset = 0;
end
```
angle(n) = atan(slope(n) ) + angleOffset;

Then angle(n) is matched to the angle in a table. The table has a column each for angles, x coordinates, y coordinates and wavelength. The angles are calculated from the arc tangent, a tan, of the slope of the line between { xw, yw} and the respective { x,y} coordinates of pure monochromatic light of the given wavelength of each row of the table. The CIE 1931 {x,y} coordinate and wavelength data for the pure monochromatic light curve is given by Table 1 of section 3.3.1 of Gunter Wyszecki, W. S. Stiles, "Color Science: Concepts and Methods, Quantitative Data and Formulas, 2nd Edition," 1982, John Wiley & Sons, NY, that is hereby incorporated by reference herein. The table with precalculated angles from the CIE 1931 {x,y} coordinates is used for expediency for converting angle to wavelength.

Thus, each {Rm,Gm,Bm} is converted to CIE 1931 {x,y} and projected to pure light 226. The corresponding wavelength, lambda, given by the aforementioned reference table is used. In an alternative embodiment, linear interpolation between corresponding angles in the table may be used to determine wavelength at finer resolution.

Figure 18:
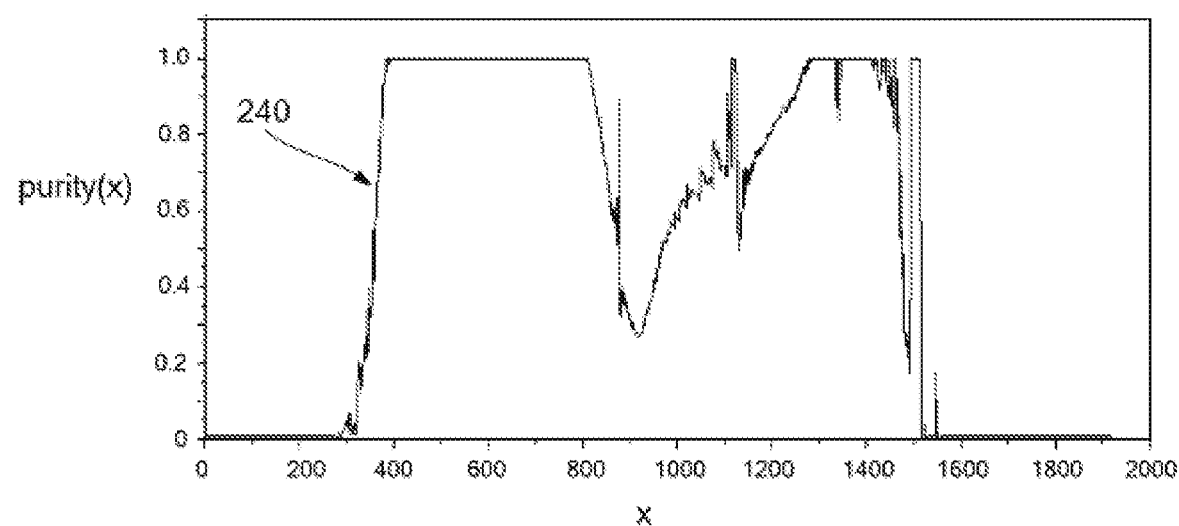
FIG. 18 is a plot of purity vs spectrogram primary axis made by using processing techniques according to embodiments of the invention.

Again referring to FIG. 17, a measure of purity of light that can be used to determine the appropriateness of treating the respective {Rm,Gm,Bm} set as a pure spectral line vs. broad-band. For an estimate of this purity, the ratio of the CIE vector length of the measured sample (from 222 to 224) to the vector length of the corresponding pure spectral line (from 222 to 228) is used. In an alternative embodiment, relative tristimulus purity is instead calculated as the ratio of the CIE vector length of the measured sample (from 222 to 230) to the vector length of the corresponding saturated tristimulus triangle (with a vertex at each of the R, G and B coordinates). Thus, in some embodiments, each spectrogram pixel in a multichannel spectrogram image may be converted to respective wavelength, FIG. 18 shows a plot of the purity estimation 240 using the tristimulus purity method, vs sample along the centroid curve (along the primary axis).

In one embodiment, the purity estimation values are used to establish nominal mapping between the spectrogram primary axis n and the remaining wavelengths. In typical spectrogram designs, there may be a non-linear relationship between spatial offset and wavelength. Cosine correction is often included to compensate. For the case where a direct image capture of the spectrogram is taken, such compensation may need to be performed through image processing. The lambda values with the highest respective purity estimation values are used to established reference (control) points for registering the corresponding portions of the cosine uncorrected spectrogram, and then the remaining wavelengths follow cosine correction established using known methods. Typically the best of the purest wavelengths to use for this purpose are first near yellow, where red and green channels are equal and second near cyan, where green and blue are equal. These two wavelength points in the spectrum tend to be especially useful for this purpose because A) the points where red and green are equal tend to be at mid-range sensitivities for two channels, where they are less likely to suffer from low signal-to-noise ratio, nor from clipping or other high level related distortion and B) the human vision system is particularly sensitive to wavelength differences near yellow and cyan, where the corresponding cones have high derivatives of sensitivity with respect to wavelength, and thus for commercial success, cameras must be particularly accurate in these regions. Yellow is better than cyan because in a typical colorimetry (including the example sRGB) yellow is fairly well saturated for the case where channels are R=G, B=0 (the yellow point on the red to green primary line within the CIE 1931 xy plane), whereas the corresponding cyan line, G=B, R=0 (cyan point on the green to blue line within the CIE 1931 xy plane) is not as saturated and the human eye is slightly less sensitive to the change in wavelength. The human eye is much less sensitive to changes in wavelengths at extremes of the visual spectra as well as in the middle of green.

Figure 19:
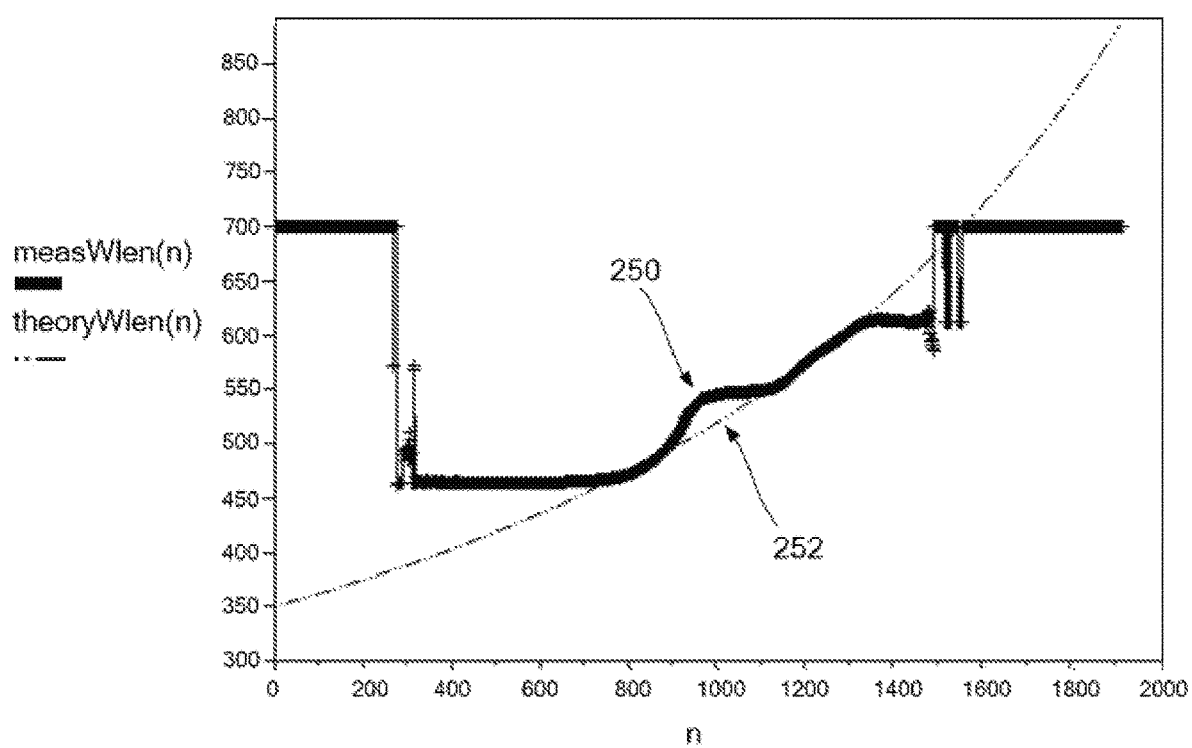
FIG. 19 includes plots of A) the measured wavelength, measWlen(n) 250, of an example wide band source and B) the theoretical wavelength, theoryWlen(n) 252, of an example wide-band light source vs. the primary spatial axis of a spectrogram made by using processing techniques according to embodiments of the invention.

Accordingly, an example of measured wavelength, measWlen(n) as 250, and cosine corrected theoretical mapping of measured wavelength, theoryWlen(n) as 252, using yellow and cyan measured points is shown in plots vs n in FIG. 19.

The RGB values are also converted to a magnitude:

$$magnitude(n) = |R(n), G(n), B(n)| = sqrt(R(n)^2 + G(n)^2 + B(n)^2)$$

Next, since wavelength typically is not a linear function of n, and a spectrometer produces magnitude vs wavelength, the next step is to determine magnitude as a function of wavelength. Note that limits in optical resolution, optical blur, cause a single essentially pure wavelength of light to be spread, and thus measured, across a span of the spectrogram primary axis n. For example, for the case where a single spectral line is alone in the spectrogram, the optical point spread function of the system will spread this wavelength of light spatially. Most applications are especially interested in wavelength and magnitude, typically with particular value given to magnitude peaks, and no particular value given to information to be gleaned from the optical point spread function. Accordingly, for each wavelength, many magnitudes may be measured across n. Among these many magnitudes for a given wavelength, magnitudes measured far from the expected location (after registration above) of the spectrogram are generally ignored since they are likely stray light or in some other way erroneous. Of the remaining magnitudes measured for the given wavelength, the maximum is taken for that wavelength. Thus the maximum magnitude within the vicinity of the theoretical location (once mapped accordingly to the above method) is used as the measured magnitude for a given wavelength(n).

If (measWlen(n1)==measWlen(n2)) and (|n1−n2|<ndiffMax)

then mag(measWlen(n1))=max(magnitude(n1), magnitude(n2))

where measWlen is the measured wavelength and
ndiffMax corresponds to the expected optical point spread function window width in sample units n.

For spectral lines this is a preferred embodiment. For broadband spectra, the measured magnitude vs. theoretical wavelength is a preferred embodiment. In the preferred embodiments, the purity estimate values are used to cross-fade between these two methods of determining magnitude for a given wavelength.

Figure 20:
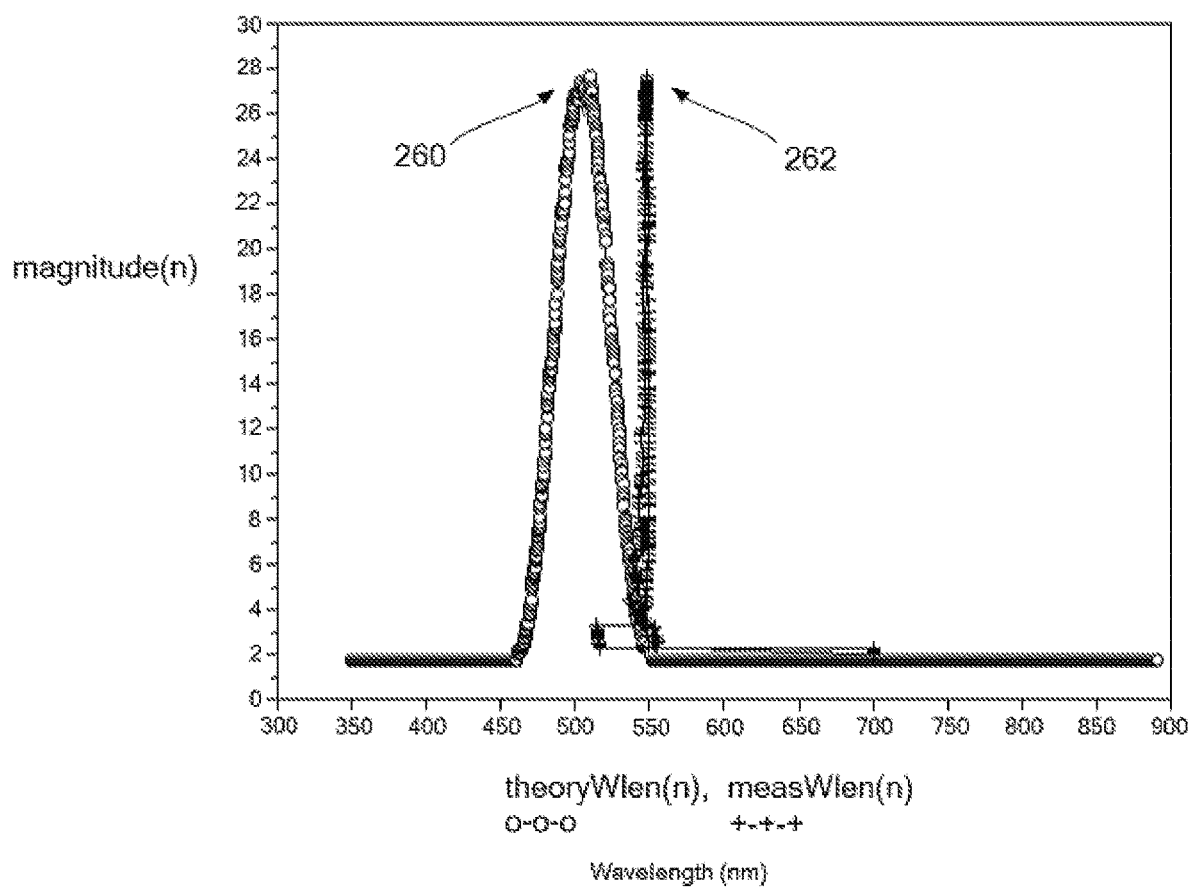
FIG. 20 is a plot of an example of a green spectral line spectrogram with poor optical resolution that may be addressed by using processing techniques according to embodiments of the invention.

FIG. 20 shows plots derived from an example of a green spectral line spectrogram with poor optical resolution. The curve 260 is a plot of the magnitude(n) vs theoretical wavelength, theoryWlen(n) according to theoretical position n for wavelengths after spectrogram registration. Thus, the poor optical resolution creates error in measurement of magnitude vs wavelength. In contrast, curve 262 is a plot of the measured magnitude vs. measured wavelength, measWlen(n) using techniques according to embodiments of the invention, thus showing greatly improved spectral resolution and even improved accuracy of the wavelength corresponding to the peak magnitude and location. Note that 262 also shows many magnitudes for essentially a single wavelength.

Figure 21:
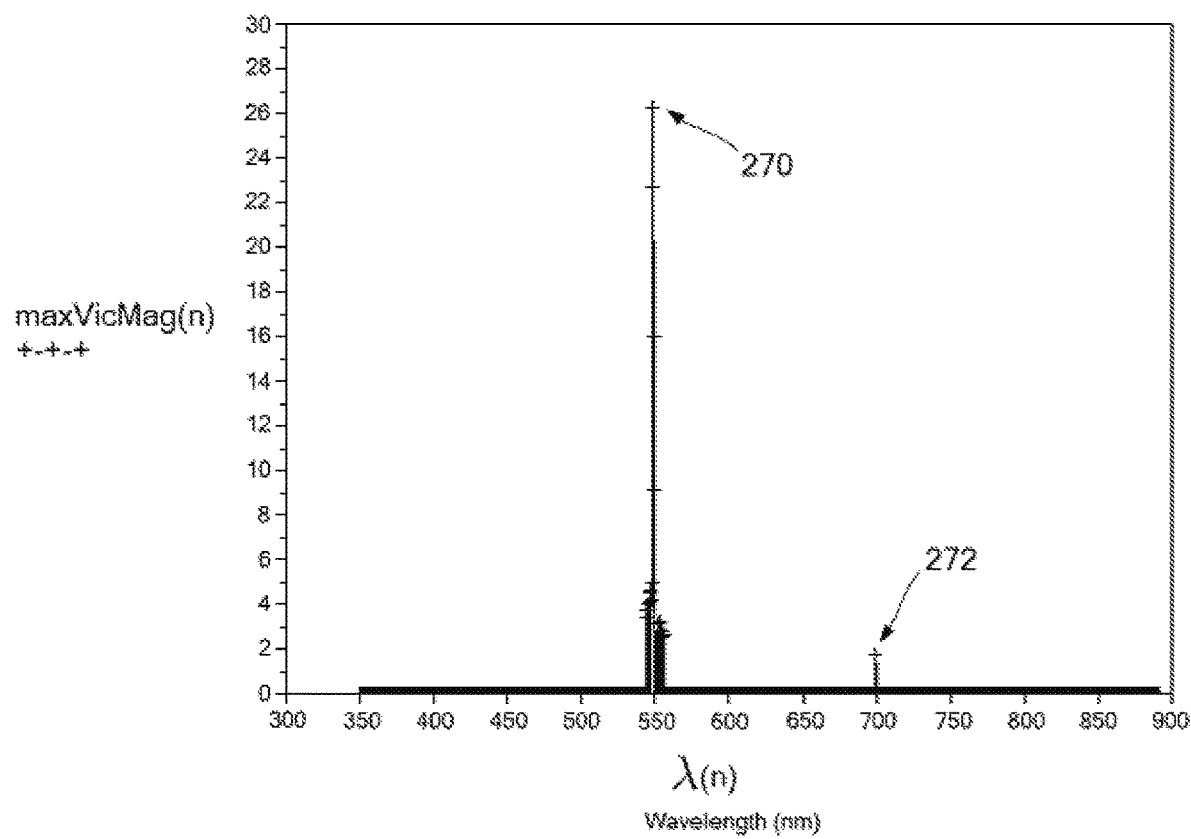
FIG. 21 shows the same main green spectral line ploted as maximum magnitude at the wavelength within the spatial vicinity of the theoretical location for the wavelength made by using processing techniques according to embodiments of the invention.

FIG. 21 shows the same example green spectral line plotted as maxVicMag(n), 270, the maximum magnitude at the wavelength within the spatial vicinity of the theoretical location for the wavelength. Comparing FIG. 21 with FIG. 20 shows that the spectral resolution has been further enhanced. A small amount of red was also present as shown as 272. In an alternative embodiment, this spectral line may further be enhanced by taking the centroid for sub-sample resolution of wavelength.

Embodiments of the invention may be used to make devices such as: A) smart phone visible spectrometer B) smart phone Raman spectrometer and C) an infra-red (IR) spectrometer from a commercially available electronic camera with altered optical filters. In one embodiment, a Raman spectrometer includes a smart phone, a means of attaching and aligning the smart phone to the spectrogram housing such as a bracket or holder, a Raman excitation laser and a photo-detector trigger of the laser. The laser is turned on when the photo-detector senses the smart phone flash. In these two examples, the imaging device and spectrometer may be either mounted or not mounted.

Figure 22:
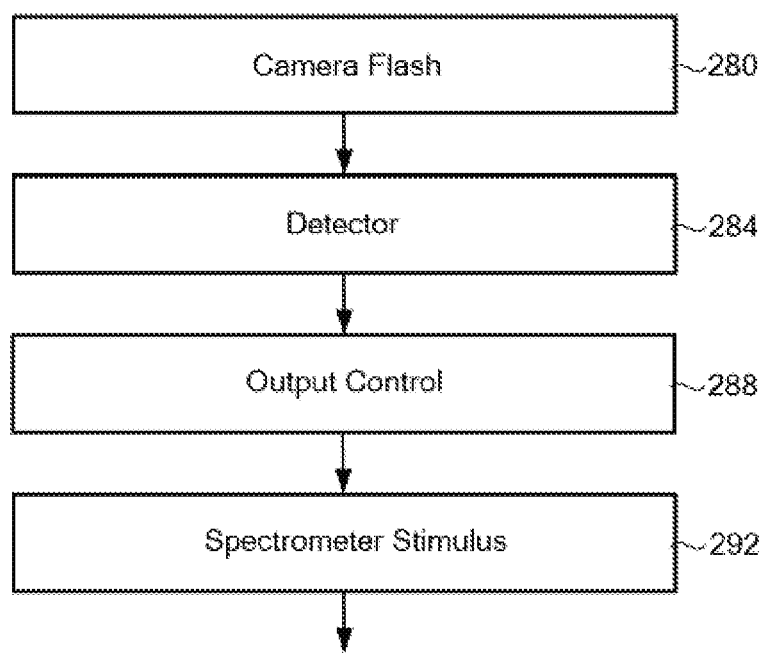
FIG. 22 is a functional block diagram illustrating stimulus control of a light or electromagnetic source controlled through use of a camera flash according to embodiments of the invention.

Embodiments of these may have spectrometer stimulus control via a camera flash as shown in FIG. 22. The camera flash device 280 creates visible light detected by the respective detector 284, which in turn signals the spectrometer stimulus output control 288, thereby controlling the spectrometer electromagnetic radiation stimulus generator 292. The aggregate response time of the flash, detector, output control and stimulus generation is sufficiently low to enable image capture by the camera.

Figure 23:
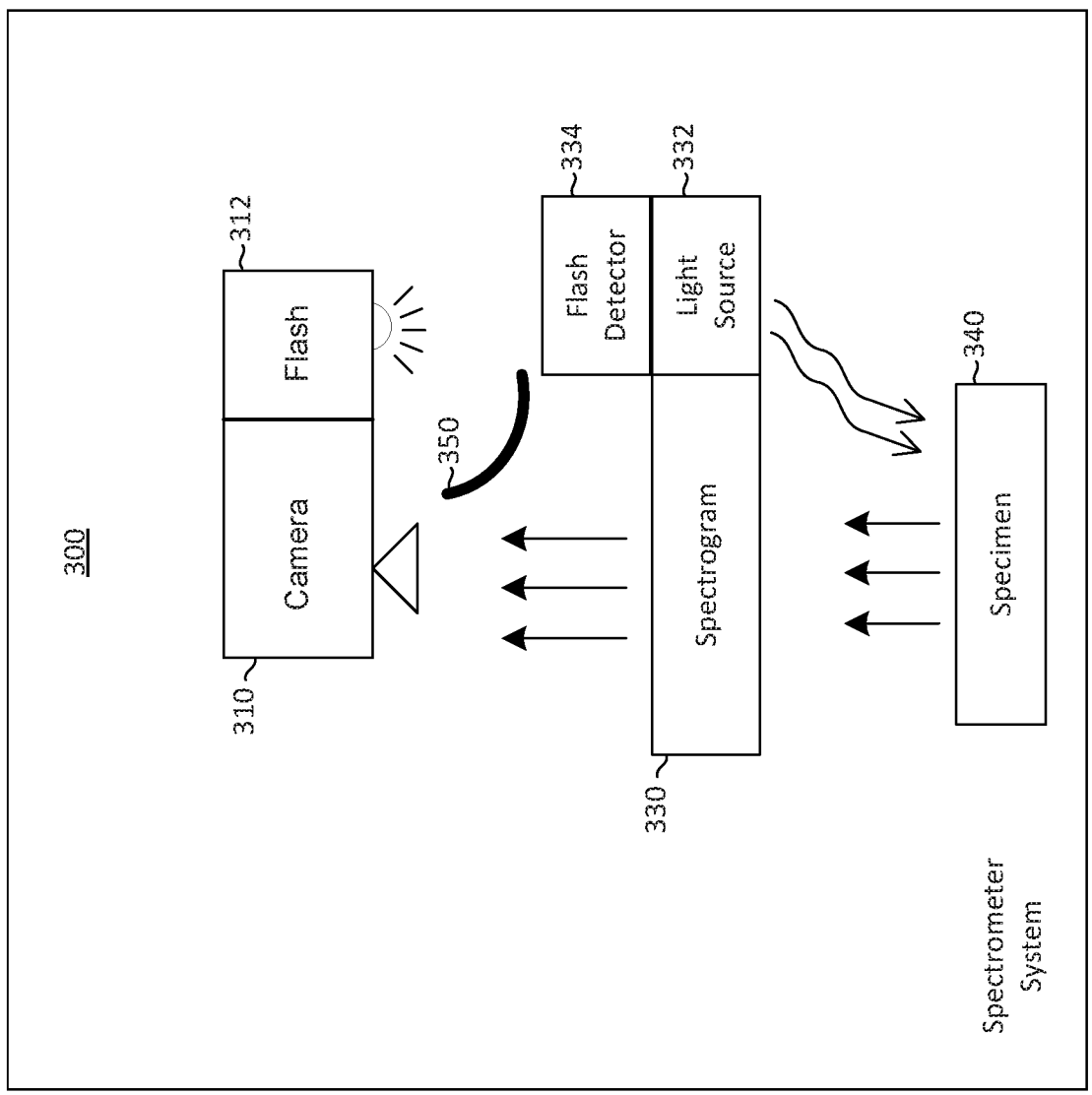
FIG. 23 is a functional block diagram of an example spectrogram system according to embodiments of the invention.

FIG. 23 is a functional block diagram of an example spectrometer system 300 according to embodiments of the invention. In some embodiments some of these components may be combined or separated. The system 300 of FIG. 23 includes a spectrogram 330 for reading electromagnetic energy from a specimen 340, as well as a light source 332 for providing light or electromagnetic energy directed to the specimen 340. A camera 310 has a lens aligned to the spectrogram 330 for reading an output of the spectrogram. The camera 310 includes a flash 312, which may be used as a signal generator. A signal or flash detector 334 is coupled to the light source 332. In operation, when the camera 310 generates a light signal from the flash 312, the flash detector 334 may detect the flash as a signal to cause the light source 332 or energy source to generate its own signal to illuminate the specimen so light or other energy may be detected at the specimen by the spectrogram 330. A light guard 350 shields the specimen from receiving light from the flash 312, which allows the desired energy from the light source 332 to be directed to the specimen without being contaminated or compromised by energy from an unwanted source. The light guard 350 may take almost any form. The camera 310 may be fastened to the spectrogram 330 or the camera may be held in a housing or bracket (not illustrated.

Although the flash 312, flash detector 334, and light source 332 are illustrated in FIG. 23 as generating or detecting light energy, embodiments of the invention are not necessarily limited to generation of visible light to perform these functions. The flash 312 may be an electromagnetic generator of any frequency, as may be the light source 332. The detector 334 needs to be able to detect the energy generated by the flash 312, of course. In some embodiments the flash 312 generates an electromagnetic frequency that is different than an electromagnetic frequency of the energy source 332.

In some embodiments the energy source 332 is a laser and the spectrometer 330 is a Raman spectrometer. In some embodiments the energy source 332 is a broad-band infrared source and the spectrometer 330 is an infra-red (IR) spectrometer. In some embodiments the energy source 332 is a broad-band ultra-violet source and the spectrometer 330 is an ultra-violet (UV) spectrometer. In some embodiments the energy source 332 is a broad-band IR-VIS-UV source and the spectrometer 330 is an ultra-violet (IR-VIS-UV) spectrometer. In some embodiments the energy source 332 is a broad-band terahertz source and the spectrometer 330 is a terahertz spectrometer. In some embodiments the energy source 332 is an electric arc or corona discharge source and the spectrometer 330 is an electric arc or corona discharge spectrometer, respectively.

Although specific embodiments of the invention have been illustrated and described for purposes if illustration, it will be understood that various modifications may be made without departing from the spirit and scope of the invention.

What is claimed is:

1. A method of multichannel spectrogram image restoration of an image, the method comprising:
   detecting a first channel signal of an image as having a clipped portion;
   detecting a second channel signal of the same image as having an unclipped portion;
   generating a scale factor minimizing a difference between corresponding portions of the first channel signal and the second channel signal of the image near the clipped portion;
   replacing the clipped portion of the first channel signal with a corresponding scaled portion of the second channel signal;
   copying a first unclipped image signal portion that is adjacent to a second clipped image signal portion;
   selecting a third unclipped image signal portion that is adjacent the second clipped image signal portion;
   selecting a forth unclipped image signal portion that is adjacent to the first unclipped image signal portion and having a same relative two-dimensional spatial offset as that between the third and second image signal portions;
   generating a scale factor as a ratio of the first unclipped image signal portion and the forth unclipped image signal portion;
   generating a fifth image signal portion by scaling the magnitudes of the first unclipped image signal portion by the scale factor; and
   replacing the second clipped image signal portion with the fifth image signal portion.

2. The method as recited in claim 1 wherein the second channel signal of the image is from an adjacent column of the spectrogram image.

3. The method as recited in claim 1 wherein the second channel signal of the image is from a same column as the first channel.

\* \* \* \* \*